March 18, 1958
G. J. LANG
2,826,916
LIQUID METER
Filed Feb. 8, 1957
2 Sheets-Sheet 1
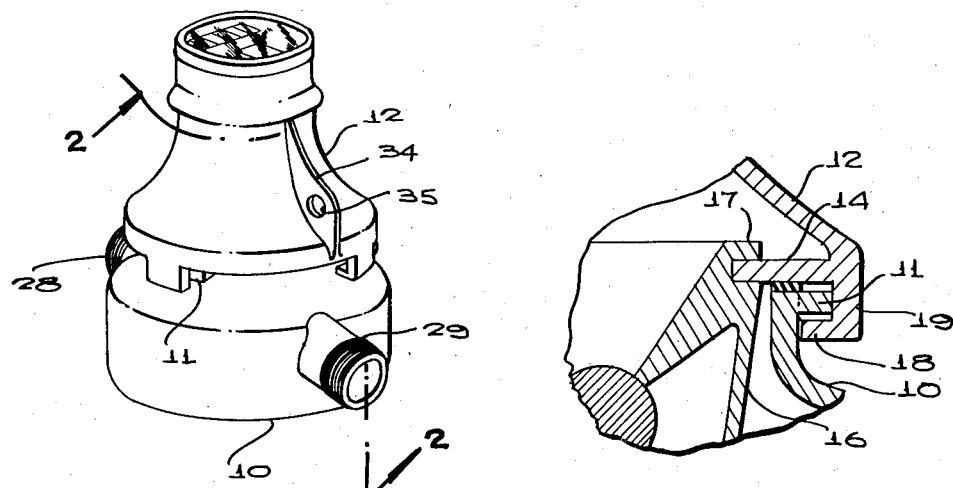
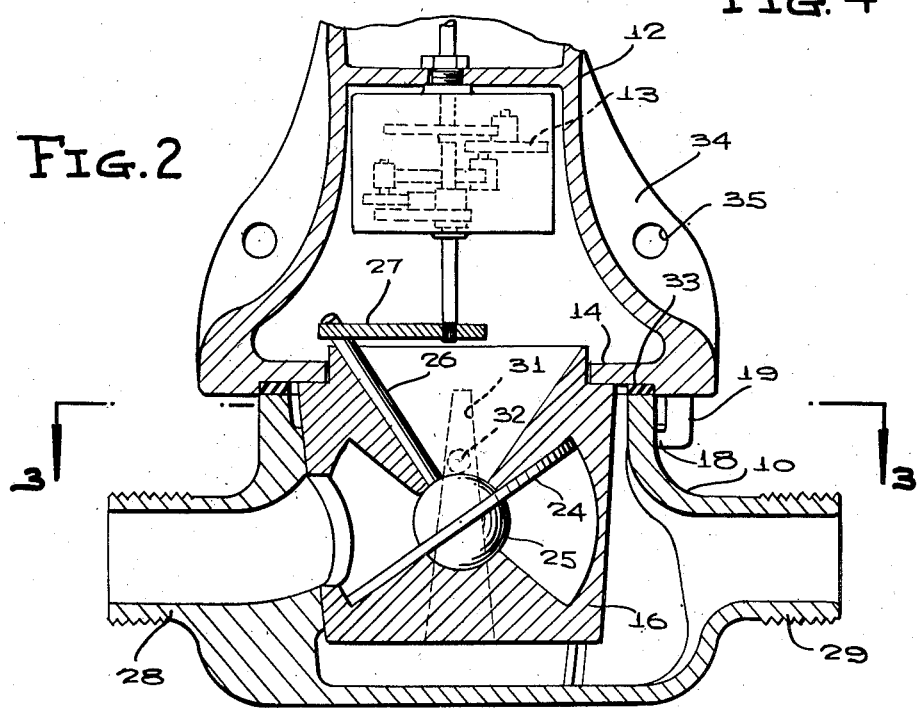
INVENTOR.
GEORGE J. LANG
BY
Mc Morrow, Berman & Davidson
ATTORNEYS

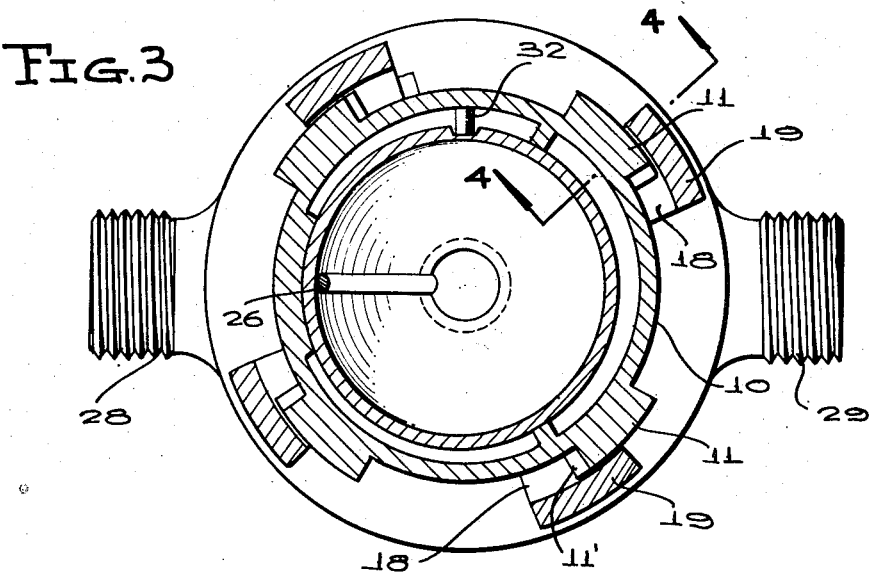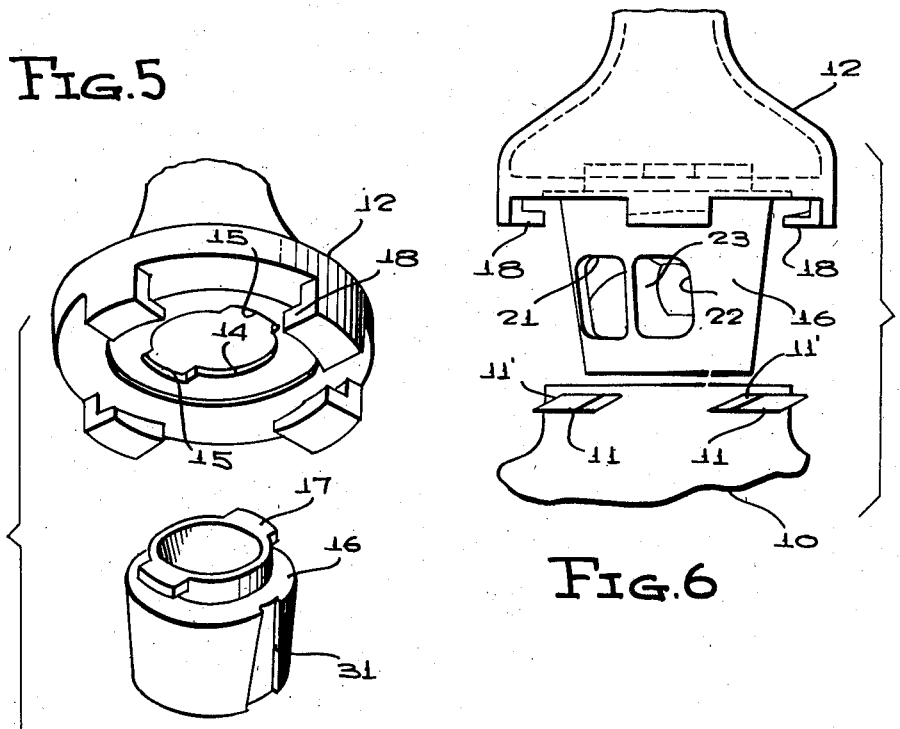

United States Patent Office 2,826,916
Patented Mar. 18, 1958

2,826,916

LIQUID METER

George J. Lang, Fresno, Calif.

Application February 8, 1957, Serial No. 638,983

3 Claims. (Cl. 73—273)

The present invention relates to a liquid meter.

An object of the present invention is to provide a liquid meter which lends itself to ready assembly and disassembly.

Another object of the present invention is to provide a liquid meter which lends itself for installation in a water supply system, one which enables the user thereof to replace its component parts with ease when worn or in disrepair and one which is sturdy in structure and simple in construction, economical to manufacture and assemble and one which is highly effective in action.

These and other objects and advantages of the present invention will be fully apparent from the following description when taken in connection with the annexed drawings, in which:

Figure 1 is an elevational view of the liquid meter according to the present invention;

Figure 2 is a sectional view, on an enlarged scale, taken on the line 2—2 of Figure 1;

Figure 3 is a sectional view taken on the line 3—3 of Figure 2;

Figure 4 is a fragmentary sectional view taken on the line 4—4 of Figure 3;

Figure 5 is an exploded view in perspective of two of the components of the present invention; and Figure 6 is an exploded view in elevation of portions of the housing and casing of the liquid meter according to the present invention.

Referring in greater detail to the drawings, in which like numerals indicate like parts throughout the several views, the liquid meter according to the present invention comprises an upstanding main meter casing 10 having an open upper end and a plurailty of lugs 11 arranged in spaced relation about the upper end of the casing 10 and projecting exteriorly from the casing 10.

An upstanding housing 12 is provided in its upper end with a glass-enclosed compartment in which is positioned a liquid volume recording mechanism (not shown) including a gear train 13, shown in dotted lines in Figure 2. The housing 12 has an open lower end and is positioned so that the lower end is spaced above and is in alignment with the open upper end of the casing 10.

An annular flange 14 extends about the interior of the housing 12 inwardly of the lower open end thereof and is carried by the housing 12. The flange 14 is provided with notches 15 on opposite sides thereof.

An upstanding plug 16 for mounting a nutating disc meter assembly is positioned below the housing 12 with the upper end of the plug 16 in alignment with and below the lower end of the housing 12. Opposed ears 17 project outwardly from the plug 16 adjacent the upper end of the latter. The ears 17 are insertable through the complemental notches 15 formed in the flange 14 and after insertion therethrough and after partial rotation of the plug 16, the ears are fully supported upon the upper surface of the flange 14.

The housing 12 dependingly carries a plurality of inwardly projecting spaced ledges 18 positioned below and spaced from the flange 14. Each of the ledges 18 has its upper surface upwardly sloping from one end to a point midway of its ends.

Each of the ledges 18 is carried on the lower end of a downwardly depending bracket member 19 formed integrally with the lower end of the housing 12. The plug 16 is provided with an inlet opening 21 and an outlet opening 22 separated by an upright partition 23. The meter mounted in the plug 16 includes a nutating disc 24 carried on a sphere 25 and having a radial slot (not shown) receiving the partition 23. An actuating pin 26 projects from the sphere 25 and engages the driving member of the gear train 13, the driving member being designated by the numeral 27. The meters of conventional construction need not be further described. The inlet opening 21 and outlet opening 22 of the plug 16 are each in registry with the inlet 28 and the outlet 29 of the casing 10.

Cooperating means is provided in the casing 10 and on the plug 16 to prevent rotation of the plug 16 relative to the casing 10 and comprises a groove 31 cut in the side of the plug 16 with a narrow upper end and a wider lower end. A pin 32 projects inwardly from one portion of the inner wall of the casing 10 and is receivable within the groove 31.

In use, the liquid meter of the present invention is assembled by inserting ears 17 of the plug 16 through the notches 15 and the flange 14 and rotating the plug 16 a partial turn so that the ears 17 are supported upon the flange 14. With the plug 16 dependingly carried by the housing 12, the housing 12 is positioned so that the plug is fully inserted through the open upper end of the casing 10 and is positioned within the casing 10. This is accomplished with the ledges 18 passing between the adjacent lugs 11 on the outer wall of the casing 10. A resilient gasket 33 is provided and is interposed between the upper end of the casing 10 and the lower surface of the flange 14 outwardly of the point of engagement of the upper end portion of the plug 16 with the flange 14. Upon rotation of the housing 12 with respect to the casing 10, the ledges 18 move under the lugs 11 with the lugs 11 moving upwardly along the sloping surfaces of the ledges 18 to compress the gasket 33 and to draw the housing 12 snugly down upon the upper end of the casing 10. The upper end portion of the plug 16 where it engages the undersurface of the flange 14 and the undersurface of the flange 14 are both machined to a sliding fit requiring no gasket. Once the plug 16 has been dependingly supported on the housing 12 and inserted to its position within the casing 10, the engagement of the pin 32 with one side of the slot 31 prevents the rotation of the plug 16 relative to the casing 10.

It will be seen, therefore, that the liquid meter of the present invention requires no bolts and nuts which become rusty or corrode and make difficult the diassembly of a meter after it has been in use for awhile. The meter according to the present invention may be disassembled by hand and reassembled with ease and without the use of special tools. If necessary, a spanner wrench (not shown) may be used to engage either one of the ribs 34 with or without use of the associated holes 35 carried by the housing 12 for applying leverage to the twisting movement necessary to remove the housing 12 from the casing 10 when it is desired to repair or replace some of the component parts.

One of the important features of the invention is the ease of removal of the plug 16 from the casing 10. At the point of discharge of the outlet side of the plug 16 into the casing 10, corrosion takes place tending to join the plug 16 to the casing 10. Upon rotation of the housing 12, the ledges 18 disengage from the respective lugs 11 on the casing 10 and, upon further rotation, strike the upwardly sloping surfaces 11' of the next lugs 11, causing the housing 12 to move upwardly with respect to the casing 10 with the flanges 14 lifting the ears 17 of the plug 16 to thereby break loose the adherence of plug 16 to the casing 10.

What is claimed is:

1. In a liquid meter, an upstanding main meter casing having an open upper end, a plurality of lugs arranged in spaced relation about the upper end of said casing and projecting exteriorly from said casing, an upstanding housing having an open lower end and carrying interiorly thereof a liquid volume recording mechanism positioned so that the lower end is spaced above and in alignment with the open upper end of said casing, an annular flange extending about the interior of said housing inwardly of the lower end thereof and carried by said housing, an upstanding mounting plug carrying a nutating disc meter assembly positioned below said housing so that the upper end of said plug is in alignment with and below the lower end of said housing, opposed ears projecting outwardly from said plug adjacent the upper end thereof, the ears of said plug being insertable through complemental notches formed in said flange and supported upon adjacent portions of said flange upon partial rotation of said plug after the ears have been fully inserted through said notches, and a plurality of spaced inwardly projecting ledges positioned below and spaced from said flange and dependingly carried by said housing, said housing carrying said plug supported therein being positionable so that the plug is fully inserted through the open upper end of said casing and positioned within said casing with said ledges passing between adjacent lugs, the lugs of said casing being supported upon said ledges upon partial rotation of said housing after the plug has been fully positioned within said casing.

2. In a liquid meter, an upstanding main meter casing having an open upper end, a plurality of lugs arranged in spaced relation about the upper end of said casing and projecting exteriorly from said casing, an upstanding housing having an open lower end and carrying interiorly thereof a liquid volume recording mechanism positioned so that the lower end is spaced above and in alignment with the open upper end of said casing, an annular flange extending about the interior of said housing inwardly of the lower end thereof and carried by said housing, an upstanding mounting plug carrying a nutating disc meter assembly positioned below said housing so that the upper end of said plug is in alignment with and below the lower end of said housing, opposed ears projecting outwardly from said plug adjacent the upper end thereof, the ears of said plug being insertable through complemental notches formed in said flange and supported upon adjacent portions of said flange upon partial rotation of said plug after the ears have been fully inserted through said notches, and a plurality of spaced inwardly projecting ledges positioned below and spaced from said flange and dependingly carried by said housing, each of said ledges having an upwardly sloping surface extending from one end to the other end thereof, said housing carrying said plug supported therein being positionable so that the plug is fully inserted through the open upper end of said casing and positioned within said casing with said ledges passing between adjacent lugs, the lugs of said casing being movable upwardly along the sloping surface of and supported upon said ledges upon partial rotation of said housing after the plug has been fully positioned within said casing.

3. In a liquid meter, an upstanding main meter casing having an open upper end, a plurality of lugs arranged in spaced relation about the upper end of said casing and projecting exteriorly from said casing, an upstanding housing having an open lower end and carrying interiorly thereof a liquid volume recording mechanism positioned so that the lower end is spaced above and in alignment with the open upper end of said casing, an annular flange extending about the interior of said housing inwardly of the lower end thereof and carried by said housing, an upstanding mounting plug carrying a nutating disc meter assembly positioned below said housing so that the upper end of said plug is in alignment with and below the lower end of said housing, opposed ears projecting outwardly from said plug adjacent the upper end thereof, the ears of said plug being insertable through complemental notches formed in said flange and supported upon adjacent portions of said flange upon partial rotation of said plug after the ears have been fully inserted through said notches, a plurality of spaced inwardly projecting ledges positioned below and spaced from said flange and dependingly carried by said housing, said housing carrying said plug supported therein being positionable so that the plug is fully inserted through the open upper end of said casing and positioned within said casing with said ledges passing between adjacent lugs, the lugs of said casing being supported upon said ledges upon partial rotation of said housing after the plug has been fully positioned within said casing, and cooperating means carried by said casing and said plug operable to prevent rotation of said plug relative to said casing when fully inserted through the open upper end of said casing and positioned within said casing.

References Cited in the file of this patent
UNITED STATES PATENTS 2,041,762    Hazard et al. _____ May 26, 1936